United States Patent [19]

Otsuka et al.

[11] Patent Number: 4,502,081
[45] Date of Patent: Feb. 26, 1985

[54] VARIABLE DENSITY SCANNER

[75] Inventors: Hirotaka Otsuka, Kawasaki; Hideo Uchida, Tokyo; Yoshihiro Uno, Machisa; Katsuo Nakazato, Tokyo; Kunio Sannomiya, Atsugi; Hidehiko Kawakami, Machida; Hiroyoshi Tsuchiya, Kawasaki, all of Japan

[73] Assignees: Matsushita Electric Industrial Co., Ltd.; Matsushita Graphic Communications Systems, Inc., both of Japan

[21] Appl. No.: 428,235

[22] Filed: Sep. 29, 1982

[51] Int. Cl.³ ............................................. H04N 1/40
[52] U.S. Cl. .................................... 358/280; 358/294
[58] Field of Search .............. 358/280, 289, 287, 293, 358/294, 285; 382/52

[56] References Cited

U.S. PATENT DOCUMENTS 4,004,079  1/1977  Boston ................................. 358/280
4,222,077  9/1980  Yamada ............................... 358/280
4,280,145  7/1981  Norrell ................................ 358/289
4,366,506 12/1982  Ejiri ..................................... 358/280
4,366,509 12/1982  Norrell ................................ 358/289
4,403,257  9/1983  Hsieh ................................... 358/280

Primary Examiner—Howard W. Britton
Attorney, Agent, or Firm—Lowe, King, Price & Becker

[57] ABSTRACT

In a variable density scanner a light beam of a fixed spot size is scanned on an original along each of a plurality of parallel line paths at a constant speed to generate a video signal and successively shifted to the next line path. The video signal is sampled to generate a video sample. Each of the line paths is divided into a plurality of line segments so that each segment derives a plurality of video samples and the line paths are formed into a plurality of groups of adjacent line paths so that the video samples are derived from a plurality of patterns of rows and columns. The total value of the video samples of each pattern is arithmetically divided by their number in response to the control signal to derive an average value.

11 Claims, 13 Drawing Figures k=0 k=1 k=2 k=3

VARIABLE DENSITY SCANNER

BACKGROUND OF THE INVENTION

The present invention relates to a variable density scanner.

Variable density scanners are known in the art for scanning a continuous tone image at a desired line density In one prior art system an optical lens system is used in combination with a flying spot scanner. The lens system is located in front of the screen to focus the spot formed thereon onto the surface of an original, the focused spot size being varied by controlling the spot size of the electron beam. However, this prior art system has various shortcomings which include low power of resolution, low brightness, picture distortion, and noise.

Another prior art system comprises a variable aperture disk having a plurality of apertures for passing a light beam through one of the apertures to form a variable beam spot on an original and a control circuit which controls the scan rates of the original in the main-scan and subscan directions in accordance with the size of the beam spot. This prior art system is also unsatisfactory since the system becomes complex and the variable range of the spot size is limited.

SUMMARY OF THE INVENTION

The present invention provides a variable density scanner having a simple and inexpensive mechanism and a wide of variable scan densities by processing video signals so that a plurality of variable size patterns of video samples is generated as a function of a desired scan density.

According to the present invention, an apparatus for scanning an original at a variable density in response to a control signal comprises first means for scanning a light beam of a fixed spot size on the original along each of a plurality of parallel line paths at a constant speed to generate a video signal and successively shifting the line path to the next by a distance variable in response to the control signal, second means for sampling the video signal at a rate variable in response to the control signal and generating therefrom a video sample, third means responsive to the control signal for dividing each of the line paths into a plurality of line segments so that each segment derives a plurality of video samples and forming the line paths into a plurality of groups of adjacent line paths so that the video samples are derived from a plurality of patterns of rows and columns, and fourth means for arithmetically dividing the total value of the video samples of each pattern by their number in response to the control signal to derive an average value.

BRIEF DESCRIPTION OF THE DRAWINGS

The present invention will be described in further detail with reference to the accompanying drawings, in which.

DETAILED DESCRIPTION

Figure 1A:
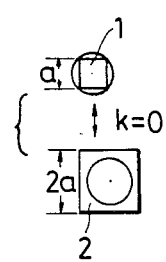
FIGS. 1a, 1b, 1c and 1d are illustrations of variable size pixels for describing the underlying principle of the invention.
Figure 1B:
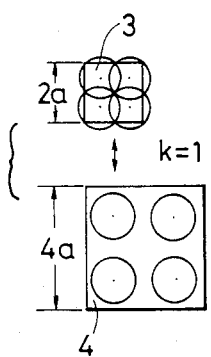
Figure 1C:
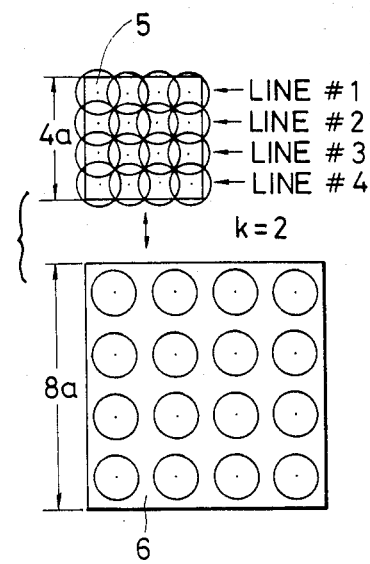
Figure 1D:
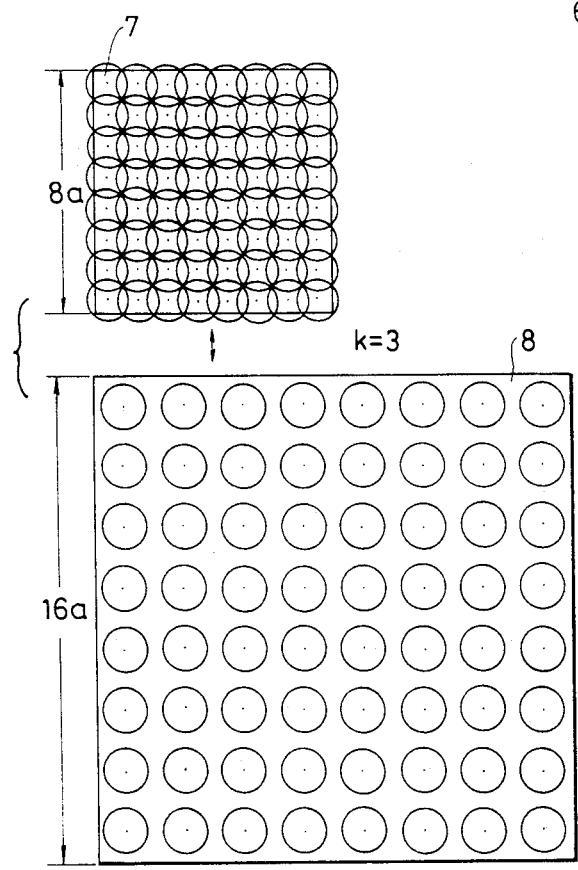

Before describing a preferred embodiment of the present invention, the underlying principle of the invention will first be described with reference to FIG. 1. Shown in FIG. 1a are square-shaped picture elements 1 and 2, or "elemental areas" on an original having a side a and a side 2a. Circles indicate light beam spots of equal size with their center corresponding to the center of each square. Line density is continuously variable between areas 1 and 2 with a ratio of 2:1. These elemental areas are combined in a number of ways to form a plurality of variable size pixels. Variable size pixels 3 and 4 having a side 2a and a side 4a, respectively, are shown in FIG. 1b, on each of which a set of four beam spots is formed. Scan density is continuously variable between pixels 3 and 4 with a ratio of 2:1 as in FIG. 1a, so that by combining the examples of FIGS. 1a and 1b it is seen that scan density is continuously variable with a ratio of 4:1. Examples shown in FIGS. 1c and 1d are further developments of the combinations comprising sets of 16 and 64 elemental areas, in which scan density is variable continuously with the ratio of 2:1. By combining the examples of FIGS. 1a to 1d, the line density is continuously variable with a ratio of 16:1. As will be described later, the video signals derived from each variable size pixel are averaged to represent the brightness of that variable size pixel. Each of the variable size pixels thus comprises a plurality of elemental areas arranged in a pattern of rows and columns with the rows corresponding to scan lines and the columns corresponding elemental areas, and respresented as follows:

$$m = 2^k$$

$$n = m^2 = 2^{2k}$$

where, k is a parameter for identifying the patterns of FIGS. 1a to 1d, m representing the number of elemental areas arranged in a main-scan or subscan and n being the number of elemental areas contained in a variable size pixel. Table 1 shows practical values of the size of elemental area and pixels and scan densities for different patterns.

TABLE 1

| k | m | n | Pixel Size (micrometers) | Scan Density (Lines/Inch) |
|---|---|---|---|---|
| 0 | 1 | 1 | 27 to 54 | 940 to 470 |
| 1 | 2 | 4 | 64 to 108 | 470 to 235 |
| 2 | 4 | 16 | 108 to 216 | 235 to 117 |
| 3 | 8 | 64 | 216 to 432 | 117 to 58 |

The variable size pixel as measured in side length varies in the range of from 27 micrometers to 432 micrometers which correspond to a range of scan densities from 940 lines/inch (LPI) to 58 LPI. The beam spot has a diameter of 34 micrometers and the elemental area is variable in a range of from a side of 27 micrometers to a side of 54 micrometers which corresponds to a range of scan densities from 940 LPI to 470 LPI.

Figure 2:
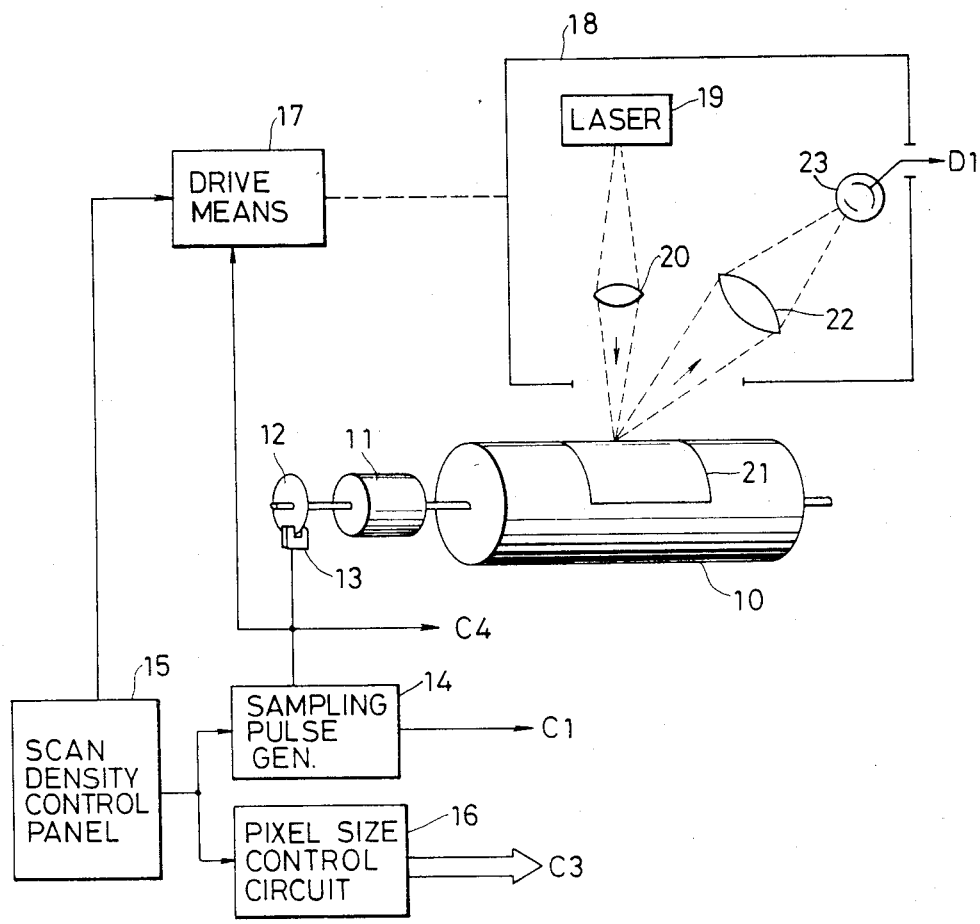
FIG. 2 is an illustration of a mechanical part of the scanner of the invention.
Figure 3:
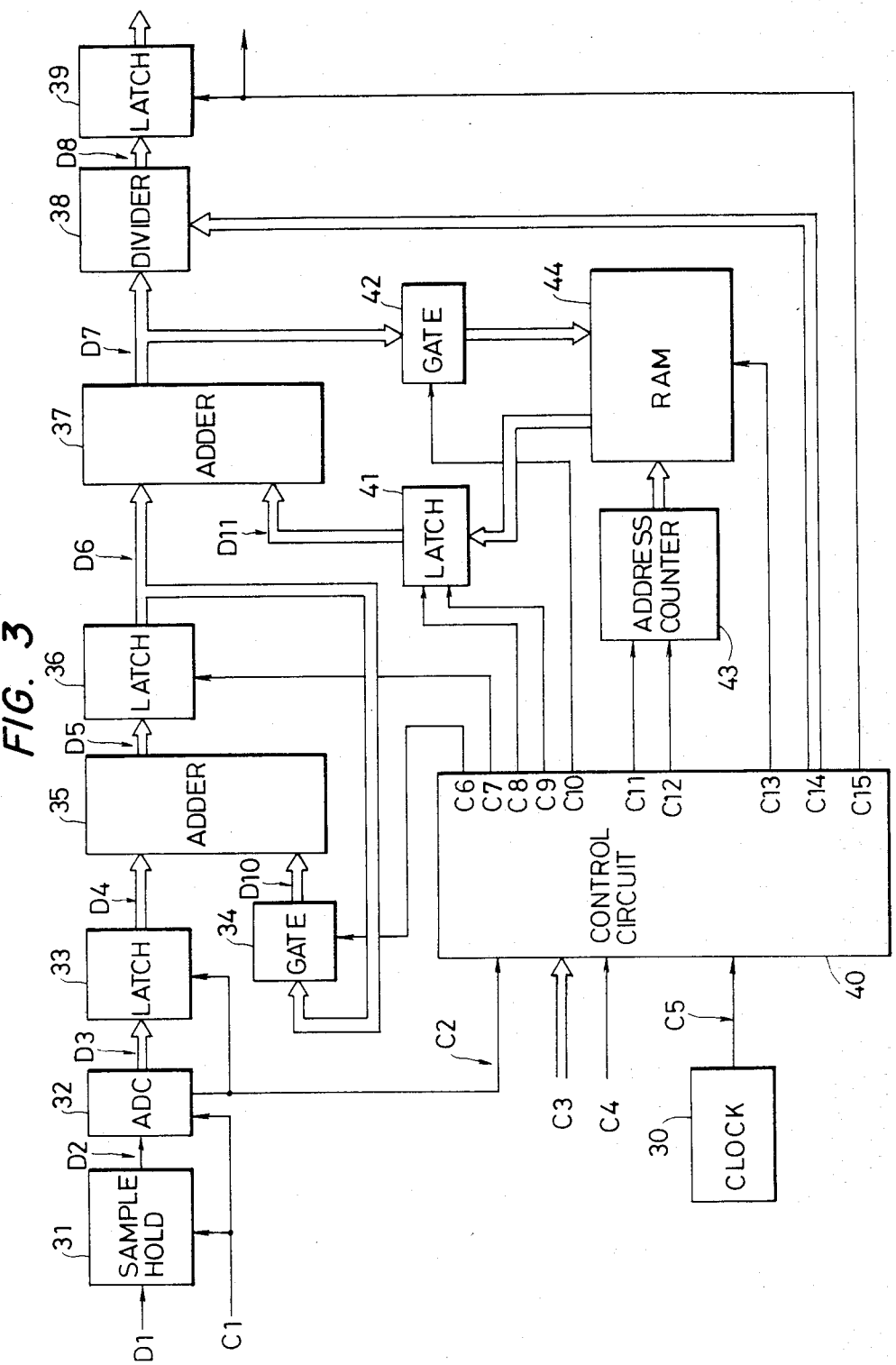
FIG. 3 is an illustration of a block diagram of the scanner of the invention.

Referring to FIGS. 2 and 3, there is shown a variable density scanner of the invention that embodies the concept of FIGS. 1a to 1d. Illustrated at 10 in FIG. 2 is a rotary drum driven by a motor 11 at a constant speed. A sync generator is provided comprising a notched wheel 12 coupled to the motor 11 and a sensor 13, which may be magnetic or photoelectrical, for generating a line sync pulse C4 for each revolution of the drum 10, the pulse being applied to a sampling pulse generator 14. A scan density control panel 15 supplies controls the sampling pulse generator 14 so that a train of sampling pulses C1 is generated immediately following the line sync pulse C4 with each sampling pulse occurring at a frequency proportional to a desired line scan density. Further connected to the control panel 15 is a pixel size control circuit 16 which, under the control of the panel 15, is arranged to produce a digital command signal indicating the size of a variable size pixel. An optical sensor 18 is movably mounted with respect to the drum 10 to direct a light beam on an original 21 rolled on the drum 10 to scan along a line path which is the direction of main scan. In a well known manner, the sensor 18 is held in position as the drum 10 rotates during the main scan and successively moved in response to the line sync pulse C4 by a drive means 17 in a direction normal to the main scan direction by a distance determined by a signal supplied thereto from the scan density control panel 15. As is known in the art the direction of movement of the optical sensor 18 is the direction of subscan. The sensor 18 comprises a light source 19, preferably a laser, an object lens 20 for focusing the laser beam on the surface of original 21, and a condenser lens 22 for collecting light reflected on the original to a photoelectrical transducer 23, producing an analog video signal D1.

It is seen that the spot size of the light falling on the original 21 has a fixed value and the drum 10 is driven at a constant speed regardless of the scan density. The mechanism of the variable density scanner is thus significantly simplified compared with prior art systems.

Figure 4:
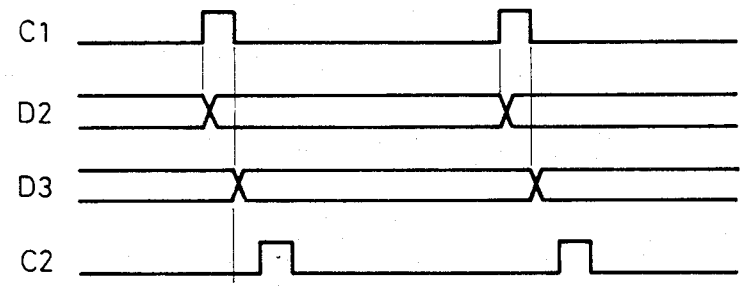
FIGS. 4, 5 and 6 are illustrations of timing diagrams useful for describing the operation of the scanner.

In FIG. 3, the video output D1 is coupled to a sample hold circuit 31 where the signal is sampled by the sampling pulse C1, the sampled value of the video signal, designated D2, being a measure of the light intensity of each elemental area on the original 21. An analog-digital converter 32 accepts the sampled signal for conversion to a digital sample D3 of 8-bit word in response to the sampling pulse C1, the digital sample being stored in an 8-bit latch 33 in response to an end-of-conversion pulse C2 (FIG. 4) provided from the converter 32.

Figure 5:
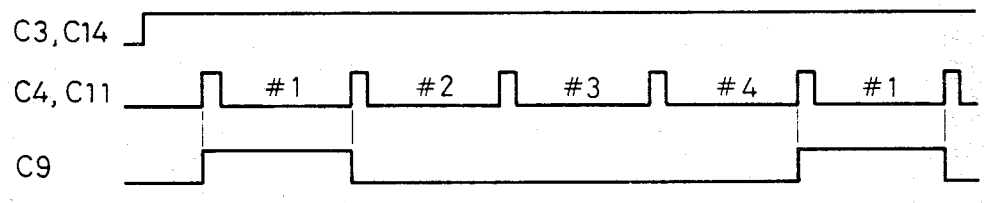
Figure 6:
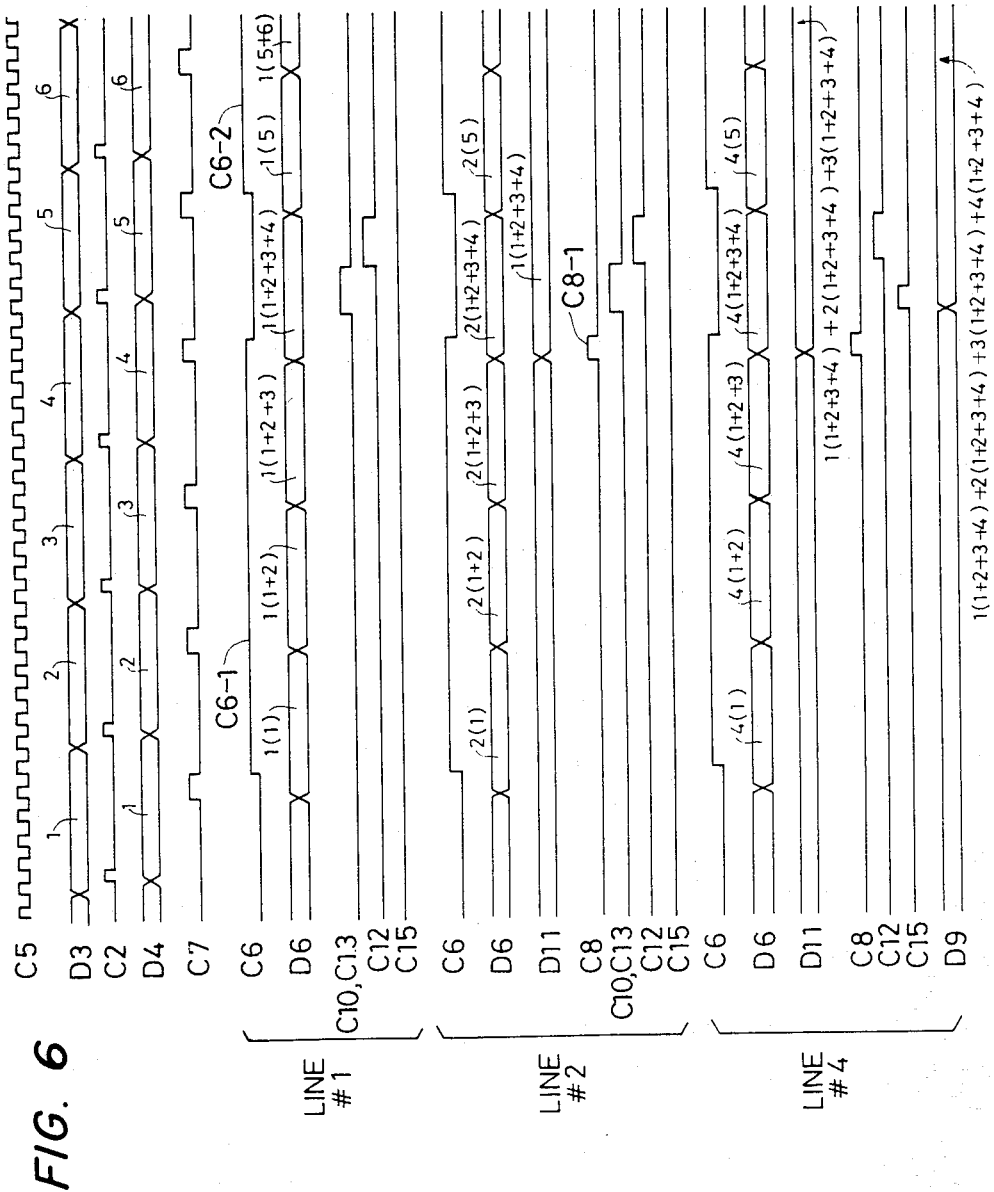
Figure 7A:
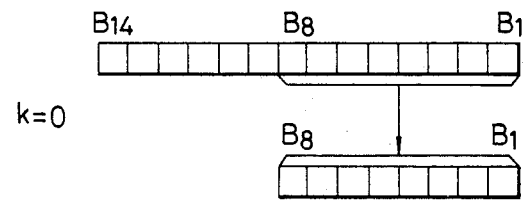
FIGS. 7a, 7b, 7c and 7d are illustrations of the operating principle of the divider of FIG. 3.
Figure 7B:
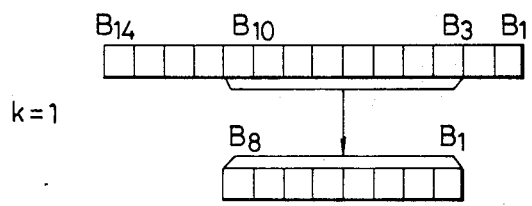
Figure 7C:
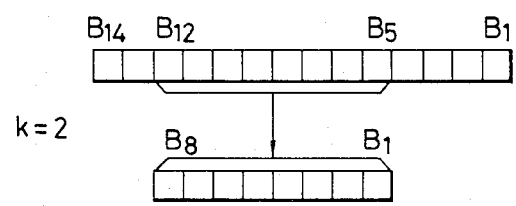
Figure 7D:
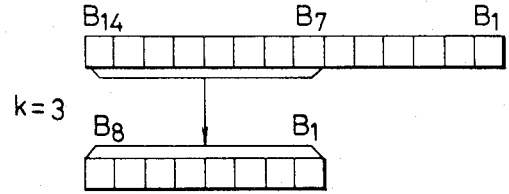

The scanner includes a control circuit 40 which receives the end-of-conversion pulse C2, line sync pulse C4, pixel size control signal C3 and time-base clock pulses from a clock source 30 to generate various control signals C6 to C15 whose timing diagrams are illustrated in FIGS. 5 and 6.

To enable each line path to be divided into a plurality of equal line segments, the apparatus is arranged to respond to the pixel size control signal by successively summing up as many digital samples as there are in each line segment. This is accomplished by a circuit comprising an 11-bit adder 35, an 11-bit latch 36 connected to the output of adder 35 and an 8-bit gate 34 for passing the output of latch 36 to an input of the adder 35. The digital sample stored in latch 33 is applied as sample D4 to an input of the adder 35 where it is arithmetically summed with a digital sample D10 which is supplied through the gate 34 in response to a gate control pulse C6 (FIG. 6) which is in turn supplied from the output of latch 36. The length of the gate control pulse C6 is determined by the pixel size control digital C3. A combined digital sample D5 is stored in latch 36 in response to a latch pulse C7 which occurs prior to the occurrence of the gate control pulse C6 as shown in FIG. 6.

Therefore, a digital sample D4 derived from the first column of the first row of each pixel is stored in latch 36 and fed to a 14-bit adder 37 as digital sample D6 and is further applied to the gate 34. During the time the gate 34 is open the digital video samples are accumulated successively to generate a digital block which corresponds to a line segment of the scanned line path which in turn corresponds to the upper four elements of the pixel 5 or 6 (FIG. 1c). By controlling the length of the gate pulse C6 it is possible to adjust the density in the direction of main scan at a desired setting desired setting in addition to the variable sampling rate.

In the following description it is assumed that the scan density parameter k is 2 for convenience. Digital samples D4 of the #1 to #3 elemental areas of the #1 scan line are summed in the adder 35 with the digital samples D10 recirculated through the gate 34 in the presense of a gate pulse C6-1 (FIG. 6), so that there is generated a sequence of data blocks D6 which are designated 1(1), 1(1+2), 1(1+2+3) and 1(1+2+3+4) where the number in the parentheses indicates the elemental area number within the #1 line segment and the number preceding the parentheses indicates the line number. In the presence of a gate pulse C6-2 a sequence of data blocks 1(5), 1(5+6), 1(5+6+7) and 1(5+6+7+8) is generated. This process is repeated until the end of the #1 line scan. The data block of the highest value represents the combined digital values of each line segment and is used for summation with the corresponding data blocks of the #2 to #4 scan lines.

To enable the line paths to be formed into a plurality of groups of adjacent line paths, the apparatus further responds to the pixel size control signal by successively summing the corresponding data blocks of the adjacent line paths. This is achieved by a circuit comprising a gate 42, a random access memory 44, an address counter 43 and a latch 41. The latch 41 is enabled in response to a latch pulse C8 which occurs during the period other than the #1 scan period and disabled in response to an inhibit pulse C9 which occurs only during the first line scan. During subsequent line scans the data block of each line segment is combined with the corresponding data blocks D11 of the previous line. These data blocks are supplied from the latch 41 as follows.

The data block that occurs at the end of each line segment of the #1 scan line D6 is delivered from the latch 36 in response to a pulse C7 to the adder 37 and thence as data block D7 to a gate 42 in response to a write enable pulse C10 and is written into the associated cell location of a random access memory 44 in response to a read/write enable pulse C13 and address data supplied from an address counter 43. This address counter 43 is responsive to a reset pulse C11 which occurs in synchronism with the line scan pulse C4 as shown in FIG. 5, to initialize the address data to the first cell location to store the data block 1(1+2+3+4) therein. The address counter 43 is incremented by one in response to a countup pulse C12 which occurs at every four data blocks as illustrated in FIG. 6 to enable the data block 1(5+6+7+8) of the next data segment to be stored in the second cell location. This process is repeated until the last data block is stored in memory 44 at the end of each line path.

During the second line scan the same process takes place until the first data block 2 (1+2+3+4) is stored in latch 36. In the absence of the disabling pulse C9, the latch 41 is now enabled to respond to a latch pulse C8-1, while the address counter 43 is initialized in response to a reset pulse C11. Thus, data block 1(1+2+3+4) is read out of the memory 44 into the latch 41 and summed with the data block 2(1+2+3+4) in the adder 37. Thus, data D7 is a combined value of the first data segments of the #1 and #2 scan lines. The address counter 43 is successively incremented in response to countup pulses C12 to read subsequent data blocks from the memory 44 to enable them to be combined with the corresponding data blocks of the #2 scan line. This process is repeated until the last data blocks of the #1 and #2 scan lines are combined in the adder 37.

The contents of the memory 44 are successively updated with the combined data blocks of the #1 and #2 lines and read out of the memory during the third line scan in response to a latch pulse C8. It will be seen that corresponding data blocks of the #1, #2, #3 and #4 line paths are successively summed in the adder 37 during the fourth line scan, producing a digital video output representing the variable size pixels.

The divider 38, which essentially comprises a 14-bit memory, is arranged to divide the digital video output from the adder 37 by the number of elemental areas (16, in this example) in accordance with a pixel size control data C14 to provide an average value of the combined digital values. Since the number of elemental areas within each variable size pixel is given by $2^{2k}$, the average value can be derived by subtracting 2 bits from the least significant position of the 14-bit memory and selecting eight higher significant bits. FIGS. 7a to 7d are illustrations of the bits selected from the total of 14 bits that represent the video signal of a given pixel for $k=0$, $k=1$, $k=2$ and $k=3$, respectively, in which Bn ($n=1$ to 14) indicates the bit position. In the case of $k=0$ in which the dividing factor equals zero an 8-bit word is selected from the first to eight bit positions. For $k=1$, lower two bits are disregarded and an 8-bit word is selected from the third to tenth bit positions. For $k=2$, lower four bits are disregarded and the output is selected from the fifth to twelveth bit positions, and for $k=3$, lower six bits are disregarded and the output is selected from the seventh to fourteenth bit positions.

The averaged value of each pixel is transferred to an output latch 39 in response to a latch pulse C15 which is generated when every fourth data block D6 of the #4 scan line is stored in latch 36.

Therefore, in the case of $k=2$, the above process is repeated at every four scan lines.

The foregoing description shows a preferred embodiment of the present invention. Various modifications are apparent to those skilled in the art without departing from the scope of the present invention which is only limited by the appended claims. Therefore, the emboidment shown and described are only illustrative, not restrictive.

What is claimed is:

1. An apparatus for scanning an original at a variable density in response to a control signal, comprising:
   first means for scanning a light beam of a fixed spot size on said original along each of a plurality of parallel line paths at a constant speed to generate a video signal and successively shifting the line path to the next;
   second means for sampling said video signal and generating therefrom a video sample;
   third means responsive to said control signal for dividing each of said line paths into a plurality of line segments so that each segment derives a plurality of said video samples and forming said line paths into a plurality of groups of adjacent line paths so that said video samples are derived from a plurality of patterns of rows and columns; and
   fourth means for arithmetically dividing the total value of the video samples of each pattern by their number in response to said control signal to derive an average value.

2. An apparatus as claimed in claim 1, wherein said first means comprises means for shifting said line path to the next by a distance variable in response to said control signal.

3. An apparatus as claimed in claim 1 or 2, wherein said second means comprises means for controlling the sampling in response to said control signal.

4. An apparatus as claimed in claim 1, wherein said third means comprises means for combining the video samples derived from each line path into a plurality of blocks of video samples, the number of video samples in each block being variable in response to said control signal and combining the corresponding blocks of video samples derived from adjacent line paths into a plurality of groups of such blocks, the number of said combined blocks in each group being variable in response to said control signal.

5. An apparatus as claimed in claim 4, wherein said combining means comprises:
   first adder means connected to said second means for successively summing the video samples therefrom with successively summed video samples from the output thereof to provide a summed video sample indicative of the total value of the video samples of each block;
   second adder means connected to said first adder means;
   memory means; and
   memory control means for successively writing said summed video sample derived from a given line path into said memory means and reading said summed video sample out of said memory means into said second adder means when the line path is shifted to the next;

6. An apparatus as claimed 5, further comprising means connected to said second means for converting the video sample to a sequence of digital samples.

7. An apparatus as claimed in claim 6, wherein said fourth means comprises:
   a memory connected to said second adder means for storing the digital samples therein; and
   means for selecting a predetermined number of digital samples from the stored digital samples in accordance with said control signal.

8. A method for scanning an original at a variable density in accordance with a control signal, comprising the steps of:
   (a) scanning a light beam of a fixed spot size on said original along each of a plurality of parallel line paths at a constant speed to generate a video signal;
   (b) successively shifting the line path to the next;
   (c) sampling said video signal and generating therefrom a video sample;
   (d) dividing each of said line paths into a plurality of line segments in accordance with said control signal so that each segment derives a plurality of said video samples;
   (e) forming said line paths into a plurality of groups of adjacent line paths in accordance with said control signal so that said video samples are derived from a plurality of patterns of rows and columns; and (f) arithmetically dividing the total value of the video samples of each pattern by their number in accordance with said control signal to derive an average value.

9. A method as claimed in claim 8, wherein the step (a) comprises shifting the line path to the next by a distance variable in response to said control signal.

10. A method as claimed in claim 8 or 9, wherein the step (b) comprises controlling the sampling rate in response to said control signal 11. A method as claimed in claim 9, wherein the step (d) comprises combining the video samples derived from each line path into a plurality of blocks of video samples, the number of video samples in each block being variable in response to said control signal and the step (e) comprises combining the corresponding blocks of video samples derived from adjacent line paths into a plurality of groups of such blocks, the number of said combined blocks in each group being variable in response to said control signal.

* * * * *